(12) United States Patent
Yadav et al.

(10) Patent No.: US 12,007,853 B2
(45) Date of Patent: Jun. 11, 2024

(54) CLUSTERED ASSET BACKUP IN NON-FEDERATED WAY

(71) Applicant: Dell Products L.P., Round Rock, TX (US)

(72) Inventors: Sunil Yadav, Bangalore (IN); Shelesh Chopra, Bangalore (IN); Preeti Varma, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/872,668

(22) Filed: Jul. 25, 2022

(65) Prior Publication Data
US 2024/0028478 A1 Jan. 25, 2024

(51) Int. Cl.
*G06F 11/14* (2006.01)
(52) U.S. Cl.
CPC ...... *G06F 11/1464* (2013.01); *G06F 2201/84* (2013.01)
(58) Field of Classification Search
CPC .......................... G06F 16/1464; G06F 2201/84
See application file for complete search history.

(56) References Cited

U.S. PATENT DOCUMENTS

| | | |
|---|---|---|
| 7,549,037 B1 | 6/2009 | Kale |
| 8,069,366 B1 | 11/2011 | Wenzel |
| 8,225,057 B1 | 7/2012 | Zheng |
| 8,595,454 B1 | 11/2013 | Nagarkar |
| 9,021,296 B1 | 4/2015 | Kiselev |
| 9,268,784 B1 | 2/2016 | Guo et al. |
| 9,398,092 B1 | 7/2016 | Singhal et al. |
| 9,501,544 B1 * | 11/2016 | Singhal .................. G06F 11/14 |
| 9,535,907 B1 | 1/2017 | Stringham |
| 9,934,107 B1 * | 4/2018 | Chikkanayakanahally ................. G06F 11/1456 |
| 10,108,502 B1 | 10/2018 | Gopinath et al. |
| 10,289,441 B1 | 5/2019 | Chopra et al. |
| 10,740,005 B1 | 8/2020 | Ives et al. |
| 10,860,427 B1 | 12/2020 | Chakraborty |
| 10,936,545 B1 * | 3/2021 | Chockalingam .... G06F 11/1448 |
| 11,048,591 B1 | 6/2021 | Mamidi |

(Continued)

OTHER PUBLICATIONS

PowerProtect Data Manager 19.9, Administration and User Guide, Dell EMC, Jan. 2022 rev. 02, (272 pages).

(Continued)

*Primary Examiner* — Kris E Mackes
*Assistant Examiner* — Tiffany Thuy Bui

(57) ABSTRACT

One or more embodiments of the invention have a cluster manager, or other related component, determine upfront which data node should perform a backup of the asset. This is achieved by running a pre-backup step, either periodically or prior to the reception of a backup request, to determine the preferred node for backup. Once the backup request is received, the cluster manager queries the preferred node, if the preferred node is still the best data node to perform the backup, then that data node performs the backup. If, however, the preferred data node no-longer is the best data node for performing the backup, the current preferred data node will signal the cluster manager with an alternative data node that is best data node to perform the backup and the cluster manager will have that alternative data node perform the backup.

19 Claims, 5 Drawing Sheets

(56) References Cited

U.S. PATENT DOCUMENTS

| | | |
|---|---|---|
| 2003/0163495 A1 | 8/2003 | Lanzatella |
| 2003/0221074 A1 | 11/2003 | Satoyama |
| 2008/0059721 A1* | 3/2008 | Turner .................. G06F 16/172 |
| | | 707/E17.032 |
| 2009/0177856 A1 | 7/2009 | Herne |
| 2016/0203054 A1 | 7/2016 | Zhang |
| 2019/0377643 A1 | 12/2019 | Zhang |
| 2021/0055996 A1 | 2/2021 | Owens et al. |
| 2021/0081287 A1* | 3/2021 | Koning ............... G06F 11/2094 |

OTHER PUBLICATIONS

Dell PowerStore: Clustering and High Availability, White Paper, Dell Technologies, Jul. 2022 (45 pages).

* cited by examiner

CLUSTERED ASSET BACKUP IN NON-FEDERATED WAY

BACKGROUND

In an enterprise environment, clustering is frequently used. One version of clustering, failover clustering, allows for a plurality of nodes to work together to increase the availability and scalability of the nodes. If a failure occurs in one or more of the nodes, other nodes are able to provide the services of the failed nodes with minimum disruptions to the end users of the node(s). To prevent loss of important data, performing backups and restorations of the assets located on the plurality of nodes or other related computing devices is necessary. However, in a clustering system that includes shared storage, performing a backup and/or restoration becomes increasingly difficult.

SUMMARY

In general, in one aspect, the invention relates to a method to perform a backup in a cluster environment comprising of a plurality of data nodes. The method begins by receiving a backup request to backup at least one asset associated with at least one of the data nodes in the cluster environment. The method then sends, in response to the backup request, a backup command from the cluster manager to a preferred data node to initiate a backup of the selected at least one asset, wherein the preferred data node is associated with the at least one asset. If the at least one asset is currently associated with the preferred data node, the preferred data node performs, the backup of the at least one asset. If the at least one asset is currently not associated with the preferred data node, the preferred data node sends, information, that an additional data node of the plurality of data nodes is currently associated with the at least one asset; and the cluster manager then sends a second backup command from the cluster manager to the additional data node to initiate the backup of the at least one asset.

In general, in a second aspect, the invention relates to a system comprised of: a plurality of data nodes, a plurality of volumes, and a cluster manager. The cluster manager comprises of at least one processor, storage device, and one memory that includes instructions. The instructions when executed by the processor, perform a method for performing a backup in a cluster environment comprised of the plurality of data nodes. The method begins by receiving a backup request to backup at least one asset associated with at least one of the data nodes in the cluster environment. The method then sends, in response to the backup request, a backup command from the cluster manager to a preferred data node to initiate a backup of the selected at least one asset, wherein the preferred data node is associated with the at least one asset. If the at least one asset is currently associated with the preferred data node, the preferred data node performs, the backup of the at least one asset. If the at least one asset is currently not associated with the preferred data node, the preferred data node sends, information, that an additional data node of the plurality of data nodes is currently associated with the at least one asset; and the cluster manager then sends a second backup command from the cluster manager to the additional data node to initiate the backup of the at least one asset.

In general, in a third aspect, the invention relates to a non-transitory computer readable medium which includes computer readable program code, which when executed by a computer processor enables the computer processor to perform a method for performing a backup in a cluster environment comprising of a plurality of data nodes. The method begins by receiving a backup request to backup at least one asset associated with at least one of the data nodes in the cluster environment. The method then sends, in response to the backup request, a backup command from the cluster manager to a preferred data node to initiate a backup of the selected at least one asset, wherein the preferred data node is associated with the at least one asset. If the at least one asset is currently associated with the preferred data node, the preferred data node performs, the backup of the at least one asset. If the at least one asset is currently not associated with the preferred data node, the preferred data node sends, information, that an additional data node of the plurality of data nodes is currently associated with the at least one asset; and the cluster manager then sends a second backup command from the cluster manager to the additional data node to initiate the backup of the at least one asset.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
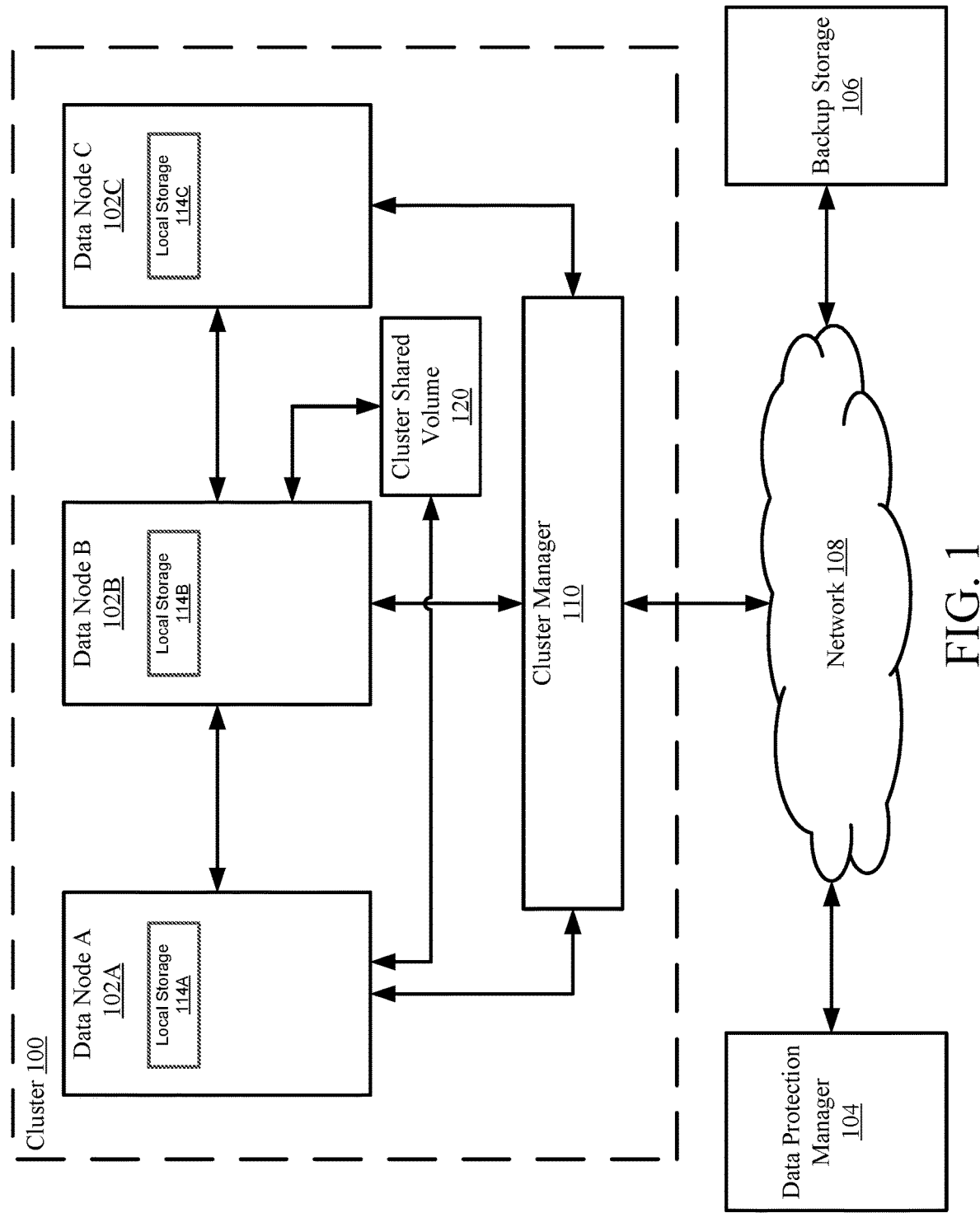
FIG. 1 shows a diagram of a cluster environment in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of the figures may be labeled as A to C. As used herein, the aforementioned labeling means that the element may include any number of items and does not require that the element include the same number of elements as any other item labeled as A to C. For example, a data structure may include a first element labeled as A and a second element labeled as C. This labeling convention means that the data structure may include any number of the elements. A second data structure, also labeled as A to C, may also include any number of elements. The number of elements of the first data structure and the number of elements of the second data structure may be the same or different.

In general, embodiments of the invention relate to systems and methods for managing data clusters. More specifically, embodiments of the invention relate to a method that performs a backup of at least one selected asset located in the data cluster. One or more embodiments of the invention perform backups (both full and incremental), in a non-federated way. In a traditional way of backing up, in a federated implementation, one data node acts as primary data node to which all backup requests are sent and that data node then delegates to another data node(s). However, there are many drawbacks to such an approach, such as increased signaling between the data nodes as well as potential security issues.

One or more embodiments of the invention have a cluster manager, or other related component, determine upfront which data node should perform a backup of the asset. This is achieved by running a pre-backup step, either periodically or prior to the reception of a backup request, to determine the preferred node to perform the backup for a given asset. Once the backup request is received, the cluster manager queries the preferred node. If the preferred node is still the best data node to perform the backup, then that data node performs the backup. If, however, the preferred data node is no-longer the best data node to perform the backup, the current preferred data node will signal the cluster manager with an alternative data node that is the best data node to perform the backup and the cluster manager will have that alternative data node perform the backup. In one or more embodiments of the invention, the data node which is the data node most suited to perform a backup of the clustered asset will perform the backup and only communicate with the cluster manager, not the other data nodes.

FIG. 1 shows a diagram of a system in accordance with one or more embodiments of the invention. The system may include a data protection manager (104), backup storage (106), and at least one data cluster (100). The system may include any number of data clusters (100) without departing from the invention. For example, the system may include two data clusters (not shown) that communicate through a network (108). The system may include additional, fewer, and/or other components without departing from the invention. Each of the components in the system may be operatively connected via any combination of wireless and/or wired networks (108).

In one or more embodiments of the invention, the data cluster (100) may include a plurality of nodes (also referred to as "data nodes") (102), a cluster manager (110), and at least one cluster shared volume(s) (120). The system may include any number of data nodes (102) without departing from the invention. For example, the system may include two data nodes (102A) and (102B) that communicate through an internal network or by other means. The system may include additional, fewer, and/or other components without departing from the invention. Each of the components of the data cluster may be operatively connected via any combination of wireless and/or wired networks (108).

In one or more embodiments of the invention, the data protection manager (104) includes the functionality to provide data protection services to the data cluster (100). The data protection manager (104) may include the functionality to provide and/or obtain other and/or additional services without departing from the invention. While FIG. 1 shows the data protection manager (104) as a separate component, it may be a part of the cluster manager (110) or located in one or more of the data nodes (e.g., 102A-102C).

To perform the aforementioned data protection services, the data protection manager (104) may include various modules such as a mapping module (not shown). The data protection manager (104) may also include persistent storage (not shown) or may store data on one or more of the local storage devices (e.g., 114A-114C) that are associated with the data nodes (e.g., 102A-102C). Alternatively, the data protection manager (104) may store data on the cluster shared volumes (e.g., 120). The data protection manager (104) may include other and/or additional components without departing from the invention. Each of the aforementioned components of the data protection manager is discussed below.

In one or more embodiments of the invention, the data protection manager (104) initiates data protection events such as discovery, backup, and restoration. The data protection manger (104) communicates with the cluster (100) so that the cluster manager (110) or appropriate node (e.g., 102A-102C) may carry out the data protection event.

In one or more embodiments of the invention, the data protection manager (104) may include a user interface that allows a user or administrator to configure or change a data protection event. This may include having a display of a graphical user interface (GUI) that presents options to a user or administrator that they may select from, such as a preferred node to perform the data protection event, or indications of which assets/applications a user or administrator wants to have protected.

Figure 3:
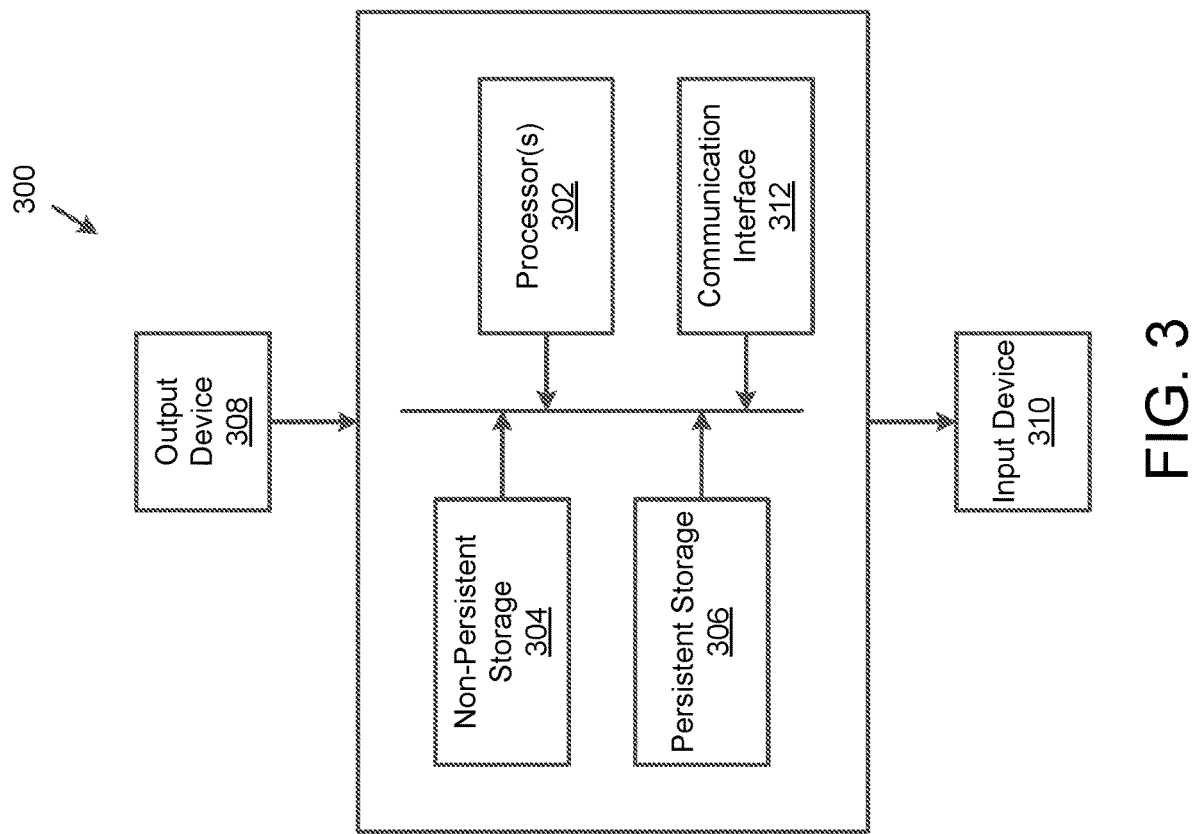
FIG. 3 shows a diagram of a computing device in accordance with one or more embodiments of the invention.

In one or more embodiments of the invention, the data protection manager (104) is implemented as a computing device (see e.g., FIG. 3). The computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data protection manager (104) as described throughout this application.

In one or more embodiments of the invention, the data protection manager (104) is implemented as a logical device. The logical device may utilize the computing resources of any number of computing devices and thereby provide the functionality of the data protection manager (104) as described throughout this application.

In one or more embodiments of the invention, the data protection manager (104) works with the backup storage (106) to store backups and mapping information. Backup storage (e.g., 106) may comprise of local storage/volumes that are stored in any of the local storage devices (e.g., 114A-114C) or the cluster shared volumes (120). In one or more embodiments of the invention, the backup storage (106) may comprise of storage that is not part of the cluster (100). Backup storage (106) may also comprise of off-site storage including but not limited to, cloud base storage, and long-term storage such as tape drives, depending on the particular needs of the user and/or the system. The backup storage (106) may include one or more processors, memory (e.g., random access memory), and persistent storage (e.g., disk drives, solid state drives, etc.).

In one or more embodiments of the invention, the backup storage (106) includes the functionality to provide backup storage services to the data nodes (e.g., 102A-102C) as discussed above. The backup storage services may include (i) obtaining backups of data generated through the performance of computer implemented services from the data nodes (100), (ii) storing data and metadata associated with the backups in persistent storage of the backup storage (106), and (iii) providing backups to the data nodes (e.g., 102A-102C) for restoration purposes and/or other and/or additional purposes without departing from the invention. The backup storage services may include the functionality to provide and/or obtain other and/or additional services without departing from the invention. The backup storage (106) may include any number of backup storages without departing from the invention.

In one or more embodiments of the invention, the backup storage (106) is implemented as a computing device (see e.g., FIG. 3). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of a backup storage (106) as described throughout this application.

In one or more embodiments of the invention, the backup storage (106) is implemented as a logical device. The logical device may utilize the computing resources of any number of computing devices and thereby provide the functionality of the backup storage (106) as described throughout this application.

In one or more embodiments of the invention the data protection manager (104) and backup storage (106) communicate with the cluster (100) through a network (108). The network (108) may take any form of network including any combination of wireless and/or wired networks. The network (108) may be a local network (LAN) or a wide area network (WLAN) including the Internet or a private enterprise network that connects with more than one location. The network (108) may be any combination of the above networks, other known network, or any combination of network types.

In one or more embodiments of the invention, the network (108) allows the cluster (100) to communicate with other clusters (not shown) and external computing devices such as (but not limited to) a data protection manager (e.g., 104) and backup storage (e.g., 106). The various components of the cluster (100) may also communicate with each other through a network. The network may be a high-speed internal network and/or include part of an external network (108). The data nodes (e.g., 120A-120C), cluster share volume (e.g., 120) and cluster manager (e.g., 110) all communicate with each other over the internal network and in one or more embodiments of the invention provide fallback functionality.

A network (e.g., (108)) may refer to an entire network or any portion thereof (e.g., a logical portion of the devices within a topology of devices). A network may include a data center network, wide area network, local area network, wireless network, cellular phone network, and/or any other suitable network that facilitates the exchange of information from one part of the network to another. A network may be located at a single physical location or be distributed at any number of physical sites. In one or more embodiments, a network may be coupled with or overlap, at least in part, with the Internet.

In one or more embodiments, although shown separately in FIG. 1, the network (108) may include any number of devices within any components (e.g., 100, 104, and 106) of the system, as well as devices external to, or between, such components of the system. In one or more embodiments, at least a portion of such devices are network devices (not shown). In one or more embodiments, a network device is a device that includes and/or is operatively connected to persistent storage (not shown), memory (e.g., random access memory (RAM)) (not shown), one or more processor(s) (e.g., integrated circuits) (not shown), and at least two physical network interfaces which may provide connections (i.e., links) to other devices (e.g., computing devices, other network devices, etc.). In one or more embodiments, a network device also includes any number of additional components (not shown), such as, for example, network chips, field programmable gate arrays (FPGAs), application specific integrated circuits (ASICs), indicator lights (not shown), fans (not shown), etc. A network device may include any other components without departing from the invention. Examples of a network device include, but are not limited to, a network switch, router, multilayer switch, fibre channel device, InfiniBand® device, etc. A network device is not limited to the aforementioned specific examples.

Figure 2A:
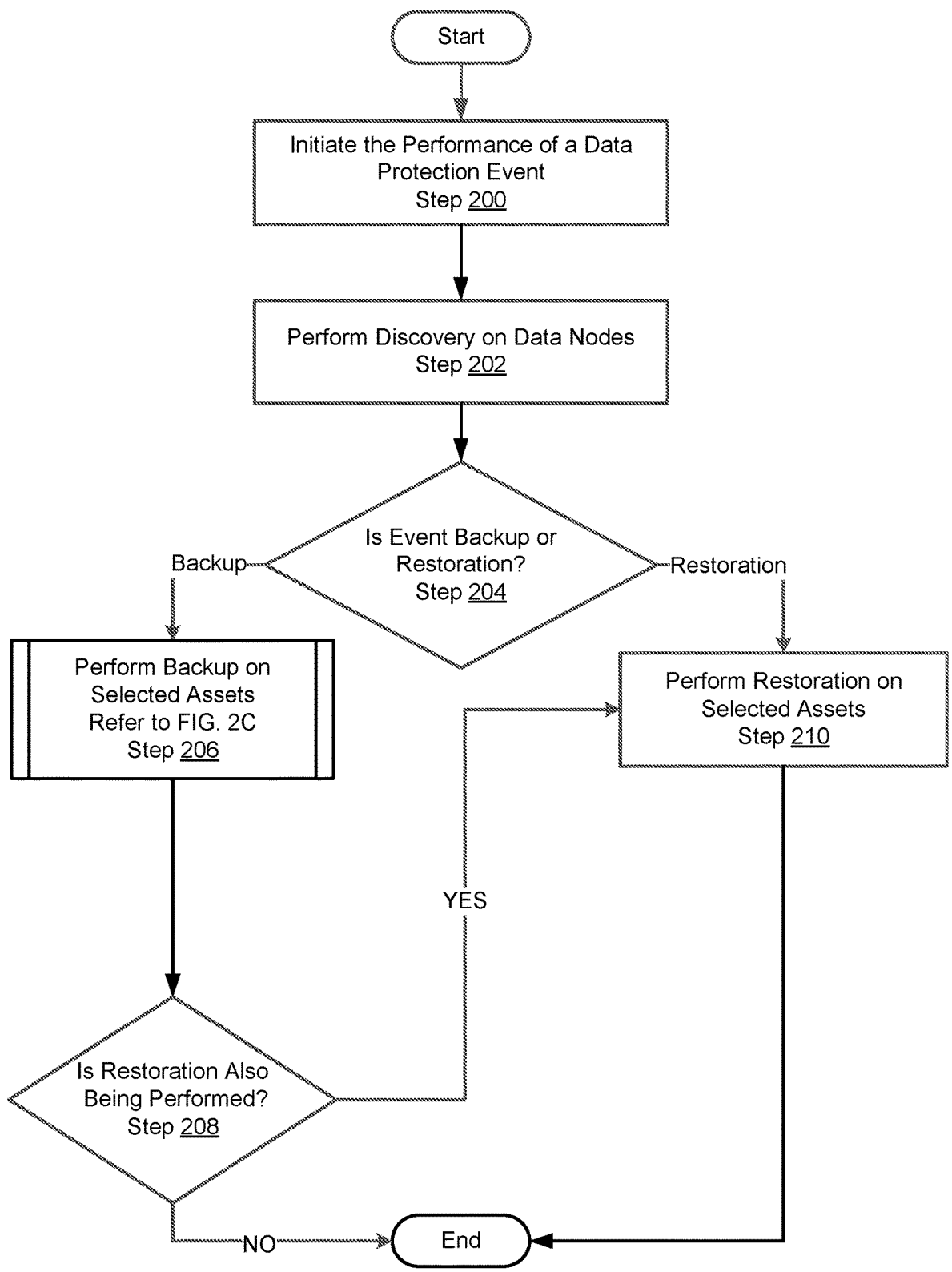
FIG. 2A shows a flowchart of a method for performing a data protection event such as a backup and/or restoration in accordance with one or more embodiments of the invention.
Figure 2B:
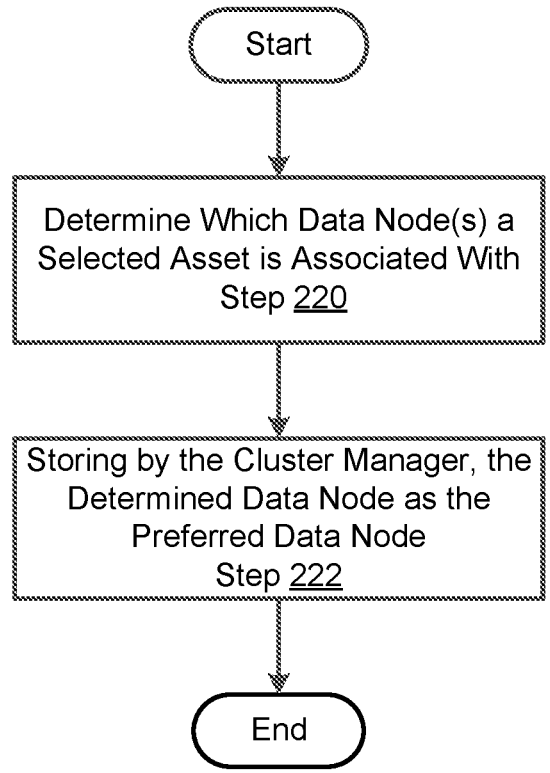
FIG. 2B shows a flowchart of a method for determining a preferred data node in accordance with one or more embodiments of the invention.
Figure 2C:
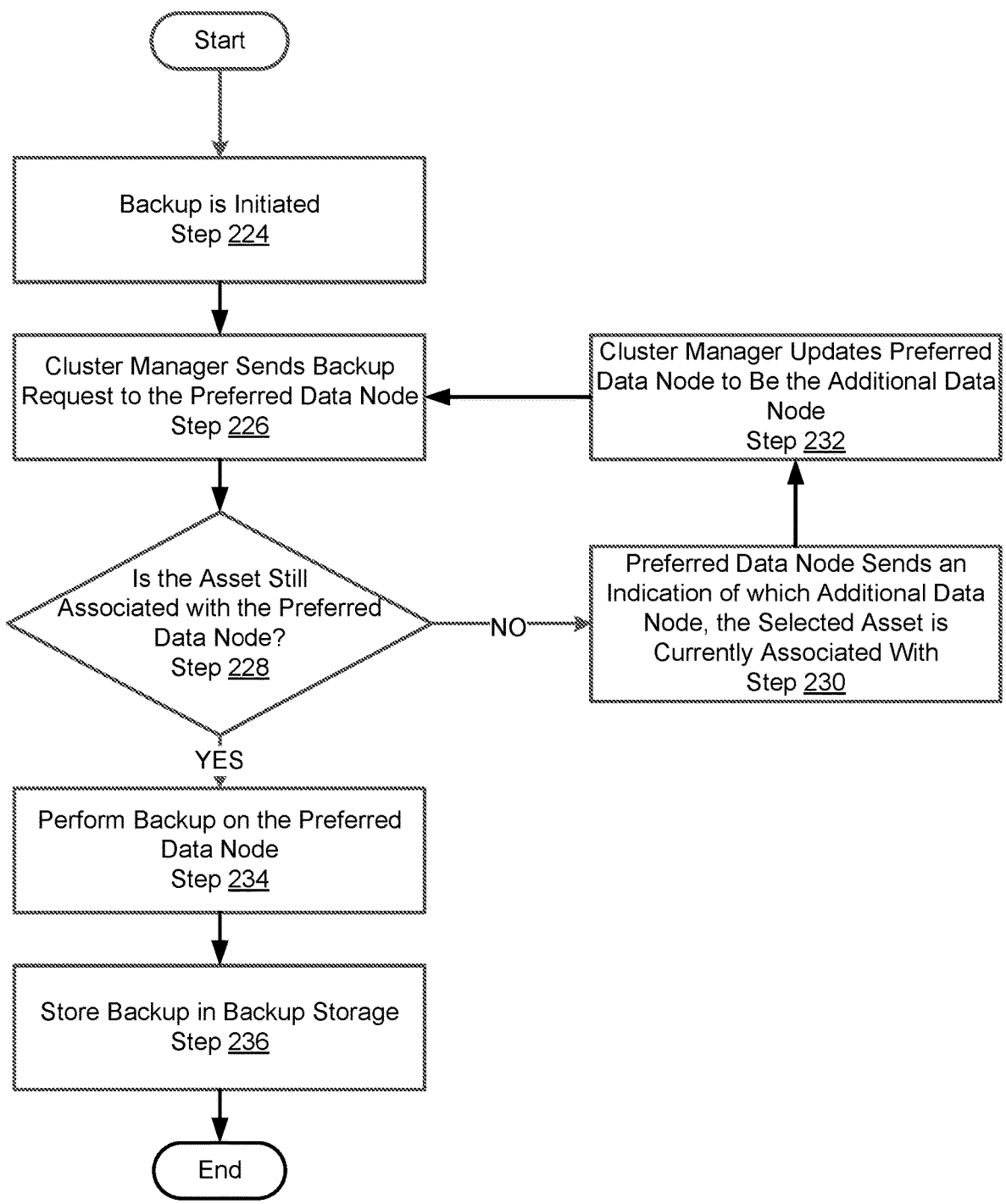
FIG. 2C shows a flowchart of a method for performing a backup in accordance with one or more embodiments of the invention.

In one or more embodiments, network devices are configured to participate in one or more network protocols, which may include discovery schemes and data protection events such as the methods described in FIGS. 2A-2C, by which a given network device may obtain information about all or any of the network topology in which the network device exists. Such discovery schemes may include sharing of information between network devices and may also include providing information to other devices within the system, such as, for example, data nodes (e.g., 102A-102C), backup storage (e.g., 120) and/or shared storages (e.g., 110).

In one or more embodiments of the invention, a data cluster (e.g., 100) may be implemented as one or more computing devices. A data cluster (e.g., (100)) may include any number of computing devices without departing from the invention. The data cluster may include different numbers of computing devices, different quantity, and types of computer resources, and may perform different computer implemented services without departing from the invention.

In one or more embodiments of the invention, the data cluster (100) includes a plurality of data nodes (e.g., 120A-120C) which each include functionality to obtain data protection services from the data protection manager (e.g., 104) and/or the cluster manager (e.g., 110). While shown as including only three data nodes (e.g., 102A-102C), the data cluster (100) may include more or less data nodes without departing from the invention, for example a cluster (e.g., 100) could comprise of at least sixteen data nodes, fifty data nodes, or a hundred data nodes without departing from the invention. The cluster may also include shared storage including at least one CSV (e.g., 120) which is active with each of the data nodes (e.g., 102A-102C) of the data cluster (100). Other types of shared storage may also or alternatively be included such as active-passive storage and local storage (e.g., 114A-114C).

In one or more embodiments of the invention, the data nodes (e.g., 102A-102B) perform workloads and provide services to clients and/or other entities not shown in the system illustrated in FIG. 1. The data nodes (e.g., 102A-102C)) may further include the functionality to perform computer implemented services for users (e.g., clients, not shown) of the data cluster (100). The computer implemented services may include, for example, database services, electronic mail services, data processing services, etc. The computer implemented services may include other and/or additional types of services without departing from the invention.

During the performance of the aforementioned services, data may be generated and/or otherwise obtained. The data nodes (e.g., 102A-102C) include local storage (e.g., 114A-114C) which may include multiple volumes, as well as shared storage which may include cluster shared volumes (CSVs e.g., 120). The various data storage volumes (e.g., 114A-114C as well as CSV 120) perform data storage services that may include storing, modifying, obtaining, and/or deleting data stored on the shared storages (e.g., 120). The data storage services may include other and/or additional services without departing from the invention. The data generated and stored on the shared storages (e.g., 114A-114C as well as CSV 120) by the data nodes (e.g., 102A-102C) may be valuable to users of the system, and therefore may be protected. The data nodes (e.g., 102A-102C) may obtain backup storage services from the backup storage (106). Alternatively, the data nodes (e.g., 102A-102C) may provide backup storage services themselves and include backup storage on the local storage (e.g., 114A-114C) or the cluster shared volumes (e.g., 120). The backup storage services may include storing backups of data stored on the shared storages for restoration purposes. The backup storage services may include other and/or additional services without departing from the invention.

The data nodes (e.g., 102A-102C) may include the functionality to perform data protection services for data stored in the various data storage volumes (e.g., 114A-114C as well as CSV 120). The data protection services may include generating backups of data stored in the shared storages (e.g., 120) and storing the backups in the backup storage. The data nodes (e.g., 102A-102C) may include the functionality to perform other and/or additional services without departing from the invention.

The data nodes (e.g., 102A-102C), may be operably connected to one or more cluster shared storages (e.g., 120) and may obtain data storage services from the one or more cluster shared storages (e.g., 120). The data nodes (e.g., 102A-102C) may be operably connected to each other and each data node (e.g., 102A) and may include the ability to use all or part of the volumes including shared active-passive drives that form the local storage (e.g., 114A-114C) of the other data nodes (e.g., 102B and 102C).

In one or more embodiments of the invention, the data nodes (e.g., 102A-102C) are implemented as computing devices (see e.g., FIG. 3). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions that are stored on the persistent storage, so that when executed by the processor(s) of the computing device cause the computing device to perform the functionality of the data nodes (e.g., 102A-102C) as described throughout this application.

In one or more embodiments of the invention, the data nodes (e.g., 102A-102C) are implemented as a logical device. The logical device may utilize the computing resources of any number of computing devices and thereby provide the functionality of the data nodes (e.g., 102A-102C) as described throughout this application.

In one or more embodiments of the invention, the data nodes (e.g., 102A-102C) include storage that includes local storage (e.g., 114A-114C) that is associated with only their assigned data node. The storage also includes shared storage such as a cluster shared volume CSV (e.g., 120). The storage may also include other types of shared volumes including active-passive shared volumes which only provide data storage services to the data nodes on which they are active.

The data nodes (e.g., 102A-102C) as well as other components of the cluster and connected devices may perform data storage services. The data storage services may include storing, modifying, obtaining, and/or deleting data stored on the local and shared storages (e.g., 114A-114C and 120) based on instructions and/or data obtained from the data nodes (e.g., 102A-102C) or other components of the cluster (e.g., 100). The data storage services may include other and/or additional services without departing from the invention. The local and shared storages (e.g., 114A-114C and 120) may include any number of storage volumes without departing from the invention.

The local and shared storages (e.g., 114A-114C and 120) may include storage devices (not shown) for storing data. The storage devices may be physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the local and shared storages (e.g., 114A-114C and 120) may utilize portions of any combination of hard disk drives, solid state disk drives, tape drives, and/or any other physical storage medium of any number of computing devices.

In one or more embodiments of the invention, the local and shared storages (e.g., 114A-114C and 120) are implemented as computing devices (see e.g., FIG. 3). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions which are stored on the persistent storage, so that when executed by the processor(s) of the computing device cause the computing device to perform the functionality of the local and shared storages (e.g., 114A-114C and 120) as described throughout this application.

In one or more embodiments of the invention, the data nodes (e.g., 102A-102C) as well as the associated local and shared storages (e.g., 114A-114C and 120) are managed by a cluster manager (e.g., 110). The cluster manager (110) performs a plurality of functions not limited to managing and configuring the services provided by the data nodes (e.g., 102A-102C), managing the mapping and movement of data on at least the shared volumes, including any cluster shared volumes (e.g., 120). The cluster manager (110) may perform other functions attributed to other components of the system or function not described herein without departing from the invention.

In one or more embodiments of the invention the cluster manager (110) includes the functionality to perform a portion, or all of, the data protection services of the data protection manager (104). This may include performing discovery of the volumes and assets associated with the data nodes (e.g., 102A-102C) including those stored on the local storage (e.g., 114A-114C) and the CSV (e.g., 120).

The cluster manager (110) may also perform, or initiate backups and restorations as well as determining a preferred data node. Exemplary methods for performing and/or initiating backups and restorations as well as determining a preferred data is discussed in more detail below with regards to the method shown in FIG. 2A-2C. The cluster manager (110) may include the functionality to perform and or obtain other and/or additional services without departing from the invention.

In one or more embodiments of the invention, the cluster manager (110) may perform discovery on the volumes and assets of the volumes and assets associated with the data nodes (e.g., 102A-102C) including those stored on the local storage (e.g., 114A-114C) and the CSV (e.g., 120). The cluster manager queries each data node (e.g., 102A-102C) and their associated local and shared storage (e.g., 114A-114C and 120). Using the results of the query, the cluster manager (110) produces an asset mapping which is stored on each of the data nodes (e.g., 102A-102C). This allows for each of the data nodes (e.g., 102A-102C) to know where a given asset is located at any given time. By updating the discovery periodically, such as, but not limited by, every fifteen seconds, the asset mapping may remain accurate and provide quicker access times with less or no inter-node messaging. Further if one data node fails, the location of the shared assets is not lost.

In one or more embodiments of the invention, the cluster manager (110) may determine a preferred data node for performing data protection such as a backup on a given asset such as a specific application and its data and/or an entire volume. An example of the method for determining the preferred data node is shown in FIG. 2B. This may be done during the periodic discovery as described above, after receiving a request for a data protection event, or at any other configured time as configured by a user, administrator, or system designer/manufacturer.

In one or more embodiments of the invention, the cluster manager (110) may receive a request to perform a data protection event from the data protection manager (e.g., 104), backup storage (e.g., 106), a user or administrator of the cluster (100), or from any other source. Once the cluster manager receives the request it may direct the appropriate data node, such as the preferred data node obtained in the method of FIG. 2B to perform the backup or a restoration, as described in more detail with regards to the method shown in FIGS. 2A and 2C).

In one or more embodiments of the invention, the cluster manager (e.g., 110, FIG. 1) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the cluster manager (e.g., 110, FIG. 1) as described throughout this application.

In one or more embodiments of the invention, the cluster manager (e.g., 110, FIG. 1) is implemented as computer instructions, e.g., computer code, stored on a persistent storage that when executed by a processor of the cluster (e.g., 100, FIG. 1) including any-one-of the data nodes (e.g., 102A-102C, FIG. 1) to provide the functionality of the cluster manager (e.g., 110, FIG. 1) as described throughout this application.

In one or more embodiments of the invention, the cluster manager (e.g., 110, FIG. 1) is implemented as a computing device (see e.g., FIG. 3). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device, cause the computing device to perform the functionality of a cluster manager (e.g., 110, FIG. 1) as described throughout this application.

In one or more embodiments of the invention, the cluster manager (e.g., 110, FIG. 1) is implemented as a logical device. The logical device may utilize the computing resources of any number of computing devices and thereby provide the functionality of the backup storage (e.g., 120, FIG. 1) as described throughout this application.

In one or more other embodiments of the invention, one or more of the functions of the cluster manager (e.g., 110, FIG. 1) including the methods of both FIG. 2A-2C may be performed by a data protection manger (e.g., 104, FIG. 1), a backup storage (e.g., 106, FIG. 1), the individual data nodes (e.g., 102A-102C, FIG. 1), or any other component of the system without departing from the invention.

FIG. 2A shows a flowchart of a method for performing a protection event. The method may be performed by, for example, a data protection manager (e.g., 104, FIG. 1) cluster manager (e.g., 110, FIG. 1), and/or data node (e.g., 102A-102C, FIG. 1). Other components of the system illustrated in FIG. 1 may perform all, or a portion, of the method of FIG. 2A without departing from the invention.

While FIG. 2A is illustrated as a series of steps, any of the steps may be omitted, performed in a different order, additional steps may be included, and/or any or all of the steps may be performed in a parallel and/or partially overlapping manner without departing from the invention.

In step 200, a data protection event is initialized. In one or more embodiments of the invention, this may be initialized based on an automatic policy or by a user/administrator's request. In accordance with one or more other embodiments of the invention the data protection event may initialized automatically when one or more data nodes have a failover event. Other means for initializing a protection event discovery event associated with a data cluster may be used without departing from the invention.

During the initialization of the data protection event, a user, administrator, or a component of the system such as the data protection manger (e.g., 104, FIG. 1) determines which assets are to be protected by the data protection event. The selected assets may be one or more selected applications (including the file system itself) that are associated with one or more data nodes (e.g., 102A-102C, FIG. 1). Alternatively, the selected assets may be one or more volumes (e.g., 114A-114C and 120, FIG. 1) associated with the data nodes (e.g., 102A-102C, FIG. 1) or any combination of applications and volumes. Other aspects of the system may be selected for backup without departing from the invention.

If not previously performed or needing updating, once the data protection event is initialized, discovery is performed in step 202. In accordance with one or more embodiments of the invention, discovery (e.g., step 202) is performed at least prior to the performance of one or more data protection events. Discovery, in accordance with one or more embodiments of the invention, may also or alternatively be performed periodically such as every five minutes or any other predetermined period of time, and may be performed prior or outside of the method of FIG. 2A. Its location after step 200 is only exemplary, and in accordance with one or more embodiments of the invention may be performed at any time that the data protection policies and/or user/administrator preferences configured the discovery to take place.

Discovery may map all the assets of a cluster (e.g., 100, FIG. 1) or a subset of the assets such as at least the selected assets. The mapping may be stored in each of the data nodes (e.g., 102A-102C, FIG. 1), the CSV (e.g., 120, FIG. 1), cluster manager (e.g., 110, FIG. 1), the data protection manager (e.g., 104, FIG. 1), backup storage (e.g., 106, FIG. 1) or other predetermined component/storage of the cluster (e.g., 100, FIG. 1) and related system.

In accordance with one or more embodiments of the invention, during discovery (e.g., step 202 of FIG. 2A), a preferred data node may be selected. An exemplary method for deterring the preferred data node is shown in FIG. 2B as described below. Other methods for determining a preferred data node may be used without departing from the invention. Further the preferred data node may be determined prior to or during other steps of the method of FIG. 2A.

Turning back to the method of FIG. 2A, once the data protection event is initialized in step 200 and in accordance with one or more embodiments of the invention, discovery is performed in step 202, the method then proceeds to step 204. In step 204 a determination is made if the protection event is a backup and/or a restoration of the selected assets. If the event includes a backup the method proceeds to step 206. Alternatively, if the event only includes a restoration of selected assets, the method proceeds to step 210.

While step 204 only describes determining between backup and restoration events, other data protection events may follow similar steps to either the backup or restoration steps as appropriate without departing form the invention. Such other events may include snapshots, archiving, migrating, and other data protection events.

In step 206, in accordance with one or more embodiments of the invention, a backup is performed using the preferred data node that is determined in the method of FIG. 2B, using the asset mapping produced during discovery (e.g., step 202). Alternatively, the mapping used for performing the backup in step 206 may be produced by other means. The method of performing the backup of the selected assets in step 206 is described in more detail with regards to the method shown in FIG. 2C and described below. Other methods for performing a backup may be used as appropriate and the invention is not limited to the method shown in FIG. 2C. Once the backup is performed in step 206, the method proceeds to step 208.

In step 208, in accordance with one or more embodiments of the invention, it may be determined if the protection policy event also includes performing a restoration. If a restoration is also to be performed the method proceeds to step 210. If a restoration is not to be performed, in one or more embodiments of the invention the method ends following step 208.

If the data protection event is determined in step 204 or 208 to also, or alternatively, include performing a restoration, the method proceeds to step 210. In step 210 a restoration is performed using a preferred data node using the asset mapping. This may be the same asset mapping used for the backup that the restoration is performed from. Alternatively, at least one new mapping is produced prior to performing the restoration. Similarly, to the backup in step 204, the asset mapping may be produced by the discovery method which is described in more detail above with regards to step 202 and with the preferred data node as described below with regards to FIG. 2B. Alternatively, the mapping and preferred data node may be produced by other means without departing from the invention.

In one or more embodiments of the invention, the method ends following step 208 or as described above after step 210 if a restoration is not to be performed.

FIG. 2B shows a flowchart of a method for determining a preferred data node to perform a data protection event or other function in accordance with one or more embodiments of the invention. The method may be performed during a discovery (e.g., step 202, FIG. 2A) or at a different time prior to performing a data protection event such as a backup as illustrated in FIG. 2C and described below. The method may be performed by, for example, the cluster manager (e.g., 110, FIG. 1) or a data protection manager (e.g., 104, FIG. 1). Other components of the system illustrated in FIG. 1 may perform all, or a portion, of the method of FIG. 2A without departing from the invention.

While FIG. 2B is illustrated as a series of steps, any of the steps may be omitted, performed in a different order, additional steps may be included, and/or any or all of the steps may be performed in a parallel and/or partially overlapping manner without departing from the invention.

In step 220, in accordance with one or more embodiments of the invention, the data node(s) with which a selected asset is associated is determined. This may be based on the mapping performed in step 202 of FIG. 2A or it may be performed using real-time telemetry from each of the data nodes (e.g., 102A-102C, FIG. 1). Other means for determining which data node(s) a selected asset is associated with may be used without departing from the invention.

Once the data node is determined in step 220, the method proceeds to step 222. In step 222 the cluster manager (e.g., 110) or other pertinent component of the system stores the data node as the preferred data node for performing a protection event such as a backup. The preferred data node may be stored in storage associated with the cluster manager (e.g., 110, FIG. 1), data protection manager (e.g., 104, FIG. 1), backup storage (e.g., 106, FIG. 1), cluster shared volumes (e.g., 120, FIG. 1), or other storage locations that may be accessed during the time a data protection event is performed.

In one or more embodiments of the invention, the method ends following step 222.

FIG. 2C shows a flowchart of a method for performing a backup of selected assets (e.g., 100, FIG. 1) in accordance with one or more embodiments of the invention. The method may be performed by, for example, the cluster manager (e.g., 110, FIG. 1) or a data protection manager (e.g., 104, FIG. 1). Other components of the system illustrated in FIG. 1 may perform all, or a portion, of the method of FIG. 2C without departing from the invention.

While FIG. 2C is illustrated as a series of steps, any of the steps may be omitted, performed in a different order, additional steps may be included, and/or any or all of the steps may be performed in a parallel and/or partially overlapping manner without departing from the invention.

In step 224, in accordance with one or more embodiments of the invention, backup is initiated. This may be as a result of a data protection event such as described in more detail above with regards to step 200 of FIG. 2A. This step may be performed after an initial discovery event associated with a data cluster is initiated. This discovery event may occur periodically or at least before the backup is performed. The discovery may include the determination of a preferred data node as described in FIG. 2B. Once a backup is initiated, the method proceeds to step 226.

In step 226, the cluster manager (e.g., 110, FIG. 1) or other pertinent component such as the data protection anger (e.g., 104, FIG. 1) sends a backup request to the data node that has been determined to be the preferred data node (such as, but not limited to, the data node determined by the method of FIG. 2A) for performing the backup of the selected asset(s).

Once the cluster manager sends the backup request to the preferred data node in step 226, the method proceeds to step 228. In step 228, in accordance with one or more embodiments of the invention, the determination is made by the preferred data node if it is still associated with the selected asset(s). Alternatively, in accordance with one or more other embodiments of the invention, this determination may be made by the cluster manager or other component that is aware of which data nodes a selected asset is associated with in real-time.

If the determination in step 228 is that the asset is not still associated with the preferred data node, the method proceeds to step 230. In step 230, in accordance with one or more embodiments of the invention, the preferred data node signals the cluster manager or other component managing the backup, that the preferred data node is not long associated with the asset, and the signal informs the cluster manager which data node the asset is currently associated with.

The method then proceeds to step 232, where the preferred data node is updated to be the data node that the asset is currently associated with. The method then repeats steps 226 and 228. If the asset is frequently moved between data nodes or the system includes a great many data nodes, the steps of 226-232 may be repeated multiple times until a preferred data node is found that may perform the backup of the asset.

Alternatively, or after performing steps 230 and 232, if the determination in step 228 is that the asset is still associated with the preferred data node, the preferred data node then performs the backup on the asset(s) in step 234. Once the backup is performed, the method then proceeds to step 236 where the backup is stored in backup storage (e.g., 106, FIG. 1) or other appropriate storage as selected by a user, administrator, and/or other data protection policy or system configuration.

In one or more embodiments of the invention, the method ends following step 236.

As discussed above, embodiments of the invention may be implemented using computing devices. FIG. 3 shows a diagram of a computing device in accordance with one or more embodiments of the invention. The computing device (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth® interface, infrared interface, network interface, optical interface, etc.), input devices (310), output devices (308), and numerous other elements (not shown) and functionalities. Each of these components are described below.

In one embodiment of the invention, the computer processor(s) (302) may be an integrated circuit for processing instructions. For example, the computer processor(s) (302) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (not shown) (e.g., a local area network (LAN), a wide area network (WAN) such as the Internet, mobile network, or any other type of network) and/or to another device, such as another computing device.

In one embodiment of the invention, the computing device (300) may include one or more output devices (308), such as a screen (e.g., a liquid crystal display (LCD), plasma display, touchscreen, cathode ray tube (CRT) monitor, projector, or other display device), printer, external storage, or any other output device. One or more of the output devices may be the same or different from the input device(s) (310). The input and output device(s) may be locally or remotely connected to the computer processor(s) (302), non-persistent storage (304), and persistent storage (306). Many diverse types of computing devices exist, and the aforementioned input and output device(s) may take other forms.

One or more embodiments of the invention may be implemented using instructions executed by one or more processors of the cluster manager. Further, such instructions may correspond to computer readable instructions that are stored on one or more non-transitory computer readable mediums.

One or more embodiments of the invention may improve the operation of one or more computing devices in a cluster environment. Specifically, embodiments of the invention relate to a method of performing a backup of at least one selected asset located in the data cluster. One or more embodiments of the invention perform backups (both full and incremental), in a non-federated way.

One or more embodiments of the invention have a cluster manager, or other related component, determine upfront which data node should perform a backup of the asset. This is achieved by running a pre-backup step, either periodically or prior to the reception of a backup request, to determine the preferred node for backup. Once the backup request is received, the cluster manager queries the preferred node. If the preferred node is still the best data node to perform the backup, then that data node performs the backup. If, however, the preferred data node is no-longer the best data node for performing the backup, the current preferred data node will signal the cluster manager with an alternative data node that is the best data node to perform the backup and the cluster manager will have that alternative data node perform the backup.

In one or more embodiments of the invention, the data node that is most suited to perform a backup of the clustered asset will perform the backup and only communicate with the cluster manager, not the other data nodes. This decreases the amount of signaling needed between the data nodes and ensures that the best data node at run-time performs a backup.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments may be devised which do not depart from the scope of the technology as disclosed herein. Accordingly, the scope of the invention should be limited only by the attached claims.

What is claimed is:

1. A method for performing a backup in a cluster environment comprising of a plurality of data nodes, the method comprising:
   receiving a backup request (BR) to backup at least one asset associated with at least one of the data nodes in the cluster environment,
      wherein a cluster manager (CM) receives the BR from a user via a client over a communication network (CN), wherein the CM and the client are operably connected to each other over the CN, wherein the CN implements a network protocol,
      wherein, before sending the BR, the user determines the at least one asset to be protected and a preferred data node that needs to perform the BR, and wherein the BR specifies the at least one asset and the preferred data node,
      wherein each of the data nodes is a computing device that comprises at least integrated circuitry that performs computer implemented services for the user;
   performing, by the CM, a discovery of assets associated with each of the data nodes, wherein based on the performing, the CM generates an asset mapping that is stored in each of the data nodes, wherein the asset mapping indicates a plurality of assets associated with each of the data nodes;
   sending, in response to the BR, a backup command from the CM to the preferred data node to initiate a backup of the at least one asset, wherein the preferred data node is associated with the at least one asset;
   based on the asset mapping and the BR, if the at least one asset is currently associated with the preferred data node:
      performing, by the preferred data node, the backup of the at least one asset;
   based on the asset mapping and the BR, if the at least one asset is currently not associated with the preferred data node:
      receiving, from the preferred node, information that specifies an additional data node of the plurality of data nodes is currently associated with the at least one asset;
      sending a second backup command from the CM to the additional data node to initiate the backup of the at least one asset; and
      based on the information and by the CM, updating the asset mapping to indicate that the additional data node is the preferred data node.

2. The method of claim 1, further comprising:
   identifying by the cluster manager the preferred data node of the plurality of data nodes with which the at least one asset is associated prior to the receiving the backup request.

3. The method of claim 1, wherein the selected at least one asset is selected by a user of the cluster environment.

4. The method of claim 1, wherein an identity of the preferred data node is determined during a discovery process that repeats periodically.

5. The method of claim 1, wherein the at least one asset is a plurality of assets.

6. The method of claim 1, wherein the at least one asset is an application and its associated data.

7. The method of claim 1, wherein the plurality of nodes do not communicate with each other in order to perform the backup.

8. The method of claim 1, wherein the cluster environment is a clustered failover system, and the plurality of data nodes are failover data nodes.

9. A system comprising:
   a plurality of nodes; and
   a cluster manager which comprises:
      at least one processor;
      at least one storage device; and
      at least one memory that includes instructions, which when executed by the processor, performs a method for performing a backup in a cluster environment comprising of the plurality of data nodes, the method comprising:
         receiving a backup request (BR) to backup at least one asset associated with at least one of the data nodes in the cluster environment,
            wherein a cluster manager (CM) receives the BR from a user via a client over a communication network (CN), wherein the CM and the client are operably connected to each other over the CN, wherein the CN implements a network protocol,
            wherein, before sending the BR, the user determines the at least one asset to be protected and a preferred data node that needs to perform the BR, and wherein the BR specifies the at least one asset and the preferred data node,
            wherein each of the data nodes is a computing device that comprises at least integrated circuitry that performs computer implemented services for the user;
         performing, by the CM, a discovery of assets associated with each of the data nodes, wherein based on the performing, the CM generates an asset mapping that is stored in each of the data nodes, wherein the asset mapping indicates a plurality of assets associated with each of the data nodes;
         sending, in response to the BR, a backup command from the CM to the preferred data node to initiate a backup of the at least one asset, wherein the preferred data node is associated with the at least one asset;
         based on the asset mapping and the BR, if the at least one asset is currently associated with the preferred data node:
            performing, by the preferred data node, the backup of the at least one asset;
         based on the asset mapping and the BR, if the at least one asset is currently not associated with the preferred data node:
            receiving, from the preferred node, information that specifies an additional data node of the plurality of data nodes is currently associated with the at least one asset;
            sending a second backup command from the CM-to the additional data node to initiate the backup of the at least one asset; and
            based on the information and by the CM, updating the asset mapping to indicate that the additional data node is the preferred node.

10. The system of claim 9, wherein the method further comprises: identifying by the cluster manager the preferred data node of the plurality of data nodes with which the at least one asset is associated prior to the receiving the backup request.

11. The system of claim 9, wherein the selected at least one asset is selected by a user of the cluster environment.

12. The system of claim 9, wherein an identity of the preferred data node is determined during a discovery process that repeats periodically.

13. The system of claim 9, wherein the at least one asset is an application and its associated data.

14. The system of claim 9, wherein the plurality of nodes do not communicate with each other in order to perform the backup.

15. The system of claim 9, wherein the cluster environment is a clustered failover system, and the plurality of data nodes are failover data nodes.

16. A non-transitory computer readable medium comprising computer readable program code, which when executed by a computer processor, enables the computer processor to perform a method for performing a backup in a cluster environment comprising of a plurality of data nodes, the method comprising:
   receiving a backup request (BR) to backup at least one asset associated with at least one of the data nodes in the cluster environment,
      wherein a cluster manager (CM) receives the BR from a user via a client over a communication network (CN), wherein the CM and the client are operably connected to each other over the CN, wherein the CN implements a network protocol,
      wherein, before sending the BR, the user determines the at least one asset to be protected and a preferred data node that needs to perform the BR, and wherein the BR specifies the at least one asset and the preferred data node,
      wherein each of the data nodes is a computing device that comprises at least integrated circuitry that performs computer implemented services for the user;
   performing, by the CM, a discovery of assets associated with each of the data nodes, wherein based on the performing, the CM generates an asset mapping that is stored in each of the data nodes, wherein the asset mapping indicates a plurality of assets associated with each of the data nodes;
   sending, in response to the BR, a backup command from the CM to the preferred data node to initiate a backup of the at least one asset, wherein the preferred data node is associated with the at least one asset;
   based on the asset mapping and the BR, if the at least one asset is currently associated with the preferred data node:
      performing, by the preferred data node, the backup of the at least one asset;
   based on the asset mapping and the BR, if the at least one asset is currently not associated with the preferred data node:
      receiving, from the preferred node, information that specifies an additional data node of the plurality of data nodes is currently associated with the at least one asset;
      sending a second backup command from the CM to the additional data node to initiate the backup of the at least one asset; and
      based on the information and by the CM, updating the asset mapping to indicate that the additional data node is the preferred data node.

17. The non-transitory computer readable medium of claim 16, further comprising: identifying by the cluster manager the preferred data node of the plurality of data nodes with which the at least one asset is associated prior to the receiving the backup request.

18. The non-transitory computer readable medium of claim 16, wherein the selected at least one asset is selected by a user of the cluster environment.

19. The non-transitory computer readable medium of claim 16, wherein an identity of the preferred data node is determined during a discovery process that repeats periodically.

* * * * *